United States Patent
Smith et al.

(10) Patent No.: US 6,222,537 B1
(45) Date of Patent: *Apr. 24, 2001

(54) USER INTERFACE CONTROLS FOR A COMPUTER SYSTEM

(75) Inventors: Andrew John Smith, Wellesbourne; David Clark, Woodloes Park; David John Roberts, Stockton; Paul Jonathan Englefield, Leamington Spa; Raymond Trainer, Warwick; Vanessa Donnelly, Coventry, all of (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,606

(22) Filed: Mar. 10, 1998

(30) Foreign Application Priority Data

Jul. 29, 1997 (GB) .................................................. 9715884
Aug. 4, 1997 (GB) .................................................. 9716304

(51) Int. Cl.[7] ..................................................... G06F 3/00
(52) U.S. Cl. ........................... 345/333; 345/335; 345/339
(58) Field of Search ............................ 345/326, 333–335, 345/339, 978; 395/701–704, 682; 709/302; 717/1–4

(56) References Cited

U.S. PATENT DOCUMENTS

| | | | | |
|---|---|---|---|---|
| 5,485,600 | * | 1/1996 | Joseph et al. ..................... | 345/349 X |
| 5,677,997 | * | 10/1997 | Talatik .............................. | 395/703 X |
| 5,721,926 | * | 2/1998 | Tamura ............................... | 395/701 |
| 5,801,687 | * | 9/1998 | Peterson et al. .................. | 345/339 X |
| 5,812,850 | * | 9/1998 | Wimble .............................. | 395/701 |
| 5,857,071 | * | 1/1999 | Haley et al. ...................... | 395/704 |
| 5,883,639 | * | 3/1999 | Walton et al. .................... | 345/334 X |
| 5,892,949 | * | 4/1999 | Noble ................................. | 717/4 |
| 6,014,137 | * | 1/2000 | Burns ................................. | 345/334 |
| 6,014,138 | * | 1/2000 | Cain et al. ........................ | 345/335 |
| 6,044,218 | * | 3/2000 | Faustini ............................. | 717/2 |
| 6,064,816 | * | 5/2000 | Parthasarathy et al. .......... | 717/4 |

FOREIGN PATENT DOCUMENTS 0587 394  3/1994  (EP) ................................ G09G/3/36

OTHER PUBLICATIONS

Software: WERCS, Hisoft, 1988.
Software, "Adobe PageMill", eg see Internet page: URL; http://w1000.mv.us.adobe.com/prodindex/pagemill/and links, Nov. 1997.

* cited by examiner

*Primary Examiner*—Raymond J. Bayerl
*Assistant Examiner*—X. L. Bautista
(74) *Attorney, Agent, or Firm*—Scully, Scott, Murphy & Presser; Casey P. August

(57) ABSTRACT

A user interface builder provides support for creation of customized user interfaces, enabling users to associate images, animation, sound clips and other media with specific predefined states of a user interface control. A set of object classes for each control predefined within the user interface builder include a first class defining the functional behavior and a comprehensive state model for the control, and a second class which encapsulates property attributes which may be set by a user to be associated with specific states of the control. In particular, desired graphics images, audio and animation sequences can be associated with a control via simple GUI interaction, avoiding the need for an interface creator to write code for standard interface control functions and so enabling easy creation of interfaces with semantic consistency and customized appearance.

18 Claims, 13 Drawing Sheets

```
//***********************************************************
//*Button state definition constants.                        *
//***********************************************************
public   static final int IDLE                      = 1;
public   static final int ROVERING                  = 2;
public   static final int IDLE_FOCUS                = 3;
public   static final int HOVERING_FOCUS            = 4;
public   static final int PENDING                   = 5;
public   static final int SUSPENDED                 = 6;
public   static final int FIRING                    = 7;
public   static final int FIRING_EXITED             = 8;
public   static final int FIRING_LOSTFOCUS          = 9;
public   static final int FIRING_EXITED_LOSTFOCUS   =10;
public   static final int DISABLED_FOCUS            =11;
public   static final int DISABLED                  =12;
```

Button State Declarations

FIG. 4

```
//****************************************************************
//*The first row of the table contains the recognized events,    *
//*and the first column the recognized states.  Intersection     *
//*cells contain the state transition for the given state/       *
//*event combination.                                            *
//****************************************************************
private static final int{}{}sStateTransitionTable <
{
    //****************************************************************
    //*Recognized events (in row 1, column 2 onwards).               *
    //****************************************************************
    {Control_IGNORED,    //*This array element is unused.           *
        java.awt.event.MouseEvent.MOUSE_PRESSED,
        java.awt.event.MouseEvent.MOUSE_RELEASED,
        java.awt.event.MouseEvent.MOUSE_ENTERED,
        java.awt.event.MouseEvent.MOUSE_EXITED,
        java.awt.event.MouseEvent.MOUSE_MOVED,
        java.awt.event.MouseEvent.MOUSE_DRAGGED,
        java.awt.event.FocusEvent.FOCUS_GAINED,
        java.awt.event.FocusEvent.FOCUS_LOST,
        MediaControllerEvent.ALL_MEDIA_COMPLETE,
        Control.ENABLE,
        Control.DISABLE},
```

Button State Transitions

```
A ·· — ·· — ·· — ·· — ·· — ·· — ·· — ·· — ·· — ·· — ·· A
//*************************************************************
//*Transitions by event for state IDLE.                        *
//*************************************************************
{IDLE,
      PENDING,              //*MOUSE_PRESSED         (not_expected)  *
      HOVERING,             //*MOUSE_RELEASED        (not_expected)  *
      HOVERING,             //*MOUSE_ENTERED                         *
      HOVERING,             //*MOUSE_MOVED           (not_expected)  *
      IDLE,                 //*MOUSE_EXITED          (not_expected)  *
      SUSPENDED,            //*MOUSE_DRAGGED         (not_expected)  *
      IDLE_FOCUS,           //*FOCUS_GAINED                          *
      IDLE,                 //*FOCUS_LOST            (not_expected)  *
      IDLE,                 //*ALL_MEDIA_COMPLETE    (not_expected)  *
      IDLE,                 //*ENABLE                (not_expected)  *
      DISABLED},            //*DISABLE                               *

//*************************************************************
//*Transitions by event for state HOVERING.                    *
//*************************************************************
{HOVERING,
      PENDING,              //*MOUSE_PRESSED                         *
      HOVERING,             //*MOUSE_RELEASED        (not_expected)  *
      HOVERING,             //*MOUSE_ENTERED         (not_expected)  *
      HOVERING,             //*MOUSE_MOVED                           *
      IDLE,                 //*MOUSE_EXITED                          *
      PENDING               //*MOUSE_DRAGGED         (not_expected)  *
      HOVERING_FOCUS,       //*FOCUS_GAINED                          *
      HOVERING,             //*FOCUS_LOST            (not_expected)  *
      HOVERING,             //*ALL_MEDIA_COMPLETE    (not_expected)  *
      HOVERING,             //*ENABLE                (not_expected)  *
      DISABLED},            //*DISABLE                               *

```
//************************************************************
//*Transitions by event for state IDLE_FOCUS.                 *
//************************************************************
{IDLE_FOCUS,
      PENDING,           //*MOUSE_PRESSED       (not_expected) *
      HOVERING_FOCUS,    //*MOUSE_RELEASED      (not_expected) *
      HOVERING_FOCUS,    //*MOUSE_ENTERED                      *
      HOVERING_FOCUS,    //*MOUSE_MOVED         (not_expected) *
      IDLE_FOCUS,        //*MOUSE_EXITED        (not_expected) *
      SUSPENDED,         //*MOUSE_DRAGGED       (not_expected) *
      IDLE_FOCUS,        //*FOCUS_GAINED                       *
      IDLE,              //*FOCUS_LOST          (not_expected) *
      IDLE_FOCUS,        //*ALL_MEDIA_COMPLETE  (not_expected) *
      IDLE_FOCUS,        //*ENABLE              (not_expected) *
      DISABLED_FOCUS},   //*DISABLE                            *
//************************************************************
//*Transitions by event for state HOVERING_FOCUS.             *
//************************************************************
{ HOVERING_FOCUS,
      PENDING,           //*MOUSE_PRESSED                      *
      HOVERING_FOCUS,    //*MOUSE_RELEASED      (not_expected) *
      HOVERING_FOCUS,    //*MOUSE_ENTERED       (not_expected) *
      HOVERING_FOCUS,    //*MOUSE_MOVED                        *
      IDLE_FOCUS,        //*MOUSE_EXITED                       *
      PENDING            //*MOUSE_DRAGGED       (not_expected) *
      HOVERING_FOCUS,    //*FOCUS_GAINED                       *
      HOVERING,          //*FOCUS_LOST          (not_expected) *
      HOVERING_FOCUS,    //*ALL_MEDIA_COMPLETE  (not_expected) *
      HOVERING_FOCUS,    //*ENABLE              (not_expected) *
      DISABLED_FOCUS},   //*DISABLE                            *
```

```
C ·——————————————————————————————————· C
//******************************************************
//*Transitions by event for state PENDING.              *
//******************************************************
{PENDING,
        PENDING,              //*MOUSE_PRESSED      (not_expected)  *
        FIRING,               //*MOUSE_RELEASED                     *
        PENDING,              //*MOUSE_ENTERED      (not_expected)  *
        HOVERING_FOCUS,       //*MOUSE_MOVED        (not_expected)  *
        SUSPENDED,            //*MOUSE_EXITED                       *
        PENDING,              //*MOUSE_DRAGGED                      *
        PENDING,              //*FOCUS_GAINED       (not_expected)  *
        PENDING,              //*FOCUS_LOST         (not_expected)  *
        PENDING,              //*ALL_MEDIA_COMPLETE (not_expected)  *
        PENDING,              //*ENABLE             (not_expected)  *
        DISABLED_FOCUS},      //*DISABLE                            *
//******************************************************
//*Transitions by event for state SUSPENDED.            *
//******************************************************
{SUSPENDED,
        SUSPENDED,            //*MOUSE_PRESSED      (not_expected)  *
        IDLE_FOCUS,           //*MOUSE_RELEASED                     *
        PENDING,              //*MOUSE_ENTERED                      *
        HOVERING_FOCUS,       //*MOUSE_MOVED        (not_expected)  *
        SUSPENDED,            //*MOUSE_EXITED       (not_expected)  *
        SUSPENDED,            //*MOUSE_DRAGGED      (not_expected)  *
        SUSPENDED,            //*FOCUS_GAINED       (not_expected)  *
        SUSPENDED,            //*FOCUS_LOST         (not_expected)  *
        SUSPENDED,            //*ALL_MEDIA_COMPLETE (not_expected)  *
        SUSPENDED,            //*ENABLE             (not_expected)  *
        DISABLED_FOCUS},      //*DISABLE                            *
D ·——————————————————————————————————· D
```

FIG. 5D

```
D ·----------------------------------D
//****************************************************************
//*Transitions by event for state FIRING.                         *
//****************************************************************
{FIRING,
      PENDING,           //*MOUSE_PRESSED                          *
      HOVERING_FOCUS,    //*MOUSE_RELEASED      (not_expected)     *
      FIRING,            //*MOUSE_ENTERED       (not_expected)     *
      FIRING,            //*MOUSE_MOVED                            *
      FIRING_EXITED,     //*MOUSE_EXITED                           *
      PENDING,           //*MOUSE_DRAGGED       (not_expected)     *
      FIRING,            //*FOCUS_GAINED        (not_expected)     *
      FIRING_LOSTFOCUS,  //*FOCUS_LOST                             *
      HOVERING_FOCUS,    //*ALL_MEDIA_COMPLETE                     *
      FIRING,            //*ENABLE              (not_expected)     *
      DISABLED_FOCUS},   //*DISABLE                                *
//****************************************************************
//*Transitions by event for state FIRING_EXITED.                  *
//****************************************************************
{FIRING_EXITED,
      PENDING,           //*MOUSE_PRESSED                          *
      HOVERING_FOCUS,    //*MOUSE_RELEASED      (not_expected)     *
      FIRING,            //*MOUSE_ENTERED                          *
      FIRING,            //*MOUSE_MOVED         (not_expected)     *
      FIRING_EXITED,     //*MOUSE_EXITED        (not_expected)     *
      PENDING,           //*MOUSE_DRAGGED       (not_expected)     *
      FIRING_EXITED,     //*FOCUS_GAINED        (not_expected)     *
      FIRING_EXITED
        _LOSTFOCUS,      //*FOCUS_LOST                             *
      IDLE_FOCUS,        //*ALL_MEDIA_COMPLETE                     *
      FIRING_EXITED,     //*ENABLE              (not_expected)     *
      DISABLED_FOCUS},   //*DISABLE                                *
E----------------------------------------E
```

//*********************************************************
//*Transitions by event for state FIRING_LOSTFOCUS.
//*********************************************************
{FIRING_LOSTFOCUS,
    PENDING,              //*MOUSE_PRESSED
    HOVERING_FOCUS,       //*MOUSE_RELEASED        (not_expected)
    FIRING_LOSTFOCUS,     //*MOUSE_ENTERED         (not_expected)
    FIRING_LOSTFOCUS,     //*MOUSE_MOVED
    FIRING_EXITED         //*MOUSE_EXITED
        _LOSTFOCUS,
    PENDING,              //*MOUSE_DRAGGED         (not_expected)
    FIRING,               //*FOCUS_GAINED
    FIRING_LOSTFOCUS,     //*FOCUS_LOST            (not_expected)
    HOVERING,             //*ALL_MEDIA_COMPLETE
    FIRING_LOSTFOCUS,     //*ENABLE                (not_expected)
    DISABLED},            //*DISABLE
//*********************************************************
//*Transitions by event for state FIRING_EXITED_LOSTFOCUS.
//*********************************************************
{FIRING_EXITED_LOSTFOCUS,
    PENDING,              //*MOUSE_PRESSED
    HOVERING_FOCUS,       //*MOUSE_RELEASED        (not_expected)
    FIRING_LOSTFOCUS,     //*MOUSE_ENTERED
    FIRING_LOSTFOCUS,     //*MOUSE_MOVED           (not_expected)
    FIRING_EXITED_        //*MOUSE_EXITED          (not_expected)
        LOSTFOCUS,
    PENDING,              //*MOUSE_DRAGGED         (not_expected)
    FIRING_EXITED,        //*FOCUS_GAINED
    FIRING_EXITED_        //*FOCUS_LOST            (not_expected)
        LOSTFOCUS,
    IDLE,                 //*ALL_MEDIA_COMPLETE
    FIRING_EXITED_        //*ENABLE                (not_expected)
        LOSTFOCUS,
    DISABLED},            //*DISABLE

```
//*****************************************************************
//*Transitions by event for state DISABLED.                        *
//*****************************************************************
{DISABLED,
      DISABLED,            //*MOUSE_PRESSED                        *
      DISABLED,            //*MOUSE_RELEASED                       *
      DISABLED,            //*MOUSE_ENTERED                        *
      DISABLED,            //*MOUSE_MOVED                          *
      DISABLED,            //*MOUSE_EXITED                         *
      DISABLED,            //*MOUSE_DRAGGED                        *
      DISABLED_FOCUS,      //*FOCUS_GAINED                         *
      DISABLED,            //*FOCUS_LOST         (not_expected)    *
      DISABLED,            //*ALL_MEDIA_COMPLETE                   *
      IDLE,                //*ENABLE                               *
      DISABLED},           //*DISABLE                              *
//*****************************************************************
//*Transitions by event for state DISABLED_FOCUS.                  *
//*****************************************************************
{DISABLED_FOCUS,
      DISABLED_FOCUS,      //*MOUSE_PRESSED                        *
      DISABLED_FOCUS,      //*MOUSE_RELEASED                       *
      DISABLED_FOCUS,      //*MOUSE_ENTERED                        *
      DISABLED_FOCUS,      //*MOUSE_MOVED                          *
      DISABLED_FOCUS,      //*MOUSE_EXITED                         *
      DISABLED_FOCUS,      //*MOUSE_DRAGGED                        *
      DISABLED_FOCUS,      //*FOCUS_GAINED      (not_expected)     *
      DISABLED,            //*FOCUS_LOST                           *
      DISABLED_FOCUS,      //*ALL_MEDIA_COMPLETE                   *
      IDE_FOCUS,           //*ENABLE                               *
      DISABLED_FOCUS},     //*DISABLE                              *
};
```

FIG. 5G

```
//*******************************************************
//*State mappings exist to reduce the number of states   *
//*that need media defined for them.  The default state  *
//* mapping for Button is defined here, and reduces all  *
//*states to just IDLE and PENDING.                      *
//*******************************************************
private static final int  sStateMappings{}{} =
{

//*******************************************************
//*This two dimensional array contains two columns, the  *
//*first for a state that is mapped, the second for the  *
//*state it is mapped to by default                      *
//*******************************************************
    {HOVERING,                   IDLE},
    {IDLE_FOCUS,                 IDLE},
    {HOVERING_FOCUS,             HOVERING},
    {SUSPENDED,                  PENDING},
    {FIRING,                     IDLE_FOCUS},
    {FIRING_EXITED,              FIRING},
    {FIRING_LOSTFOCUS,           FIRING},
    {FIRING_EXITED_LOSTFOCUS,    FIRING_LOSTFOCUS},
    {DISABLED,                   IDLE},
    {DISABLED_FOCUS,             DISABLED}
};
```

Default State Mappings

FIG. 6

```
//***********************************************************
//*Initial state of a newly constructed Button.              *
//***********************************************************
private static final int aInitialState = IDLE;
```

Default Initial State

FIG. 7

USER INTERFACE CONTROLS FOR A COMPUTER SYSTEM

FIELD OF THE INVENTION

The present invention relates to computer system user interface controls and in particular to supporting flexible creation of user interfaces.

BACKGROUND OF THE INVENTION

Graphical user interfaces (GUIs) are a required feature of very many computer application programs, because of the ease of use that they provide as compared with most alternatives. Users generally do not want to be required to know specific commands, operators, syntax rules, etc, and much work has been expended on developing user interfaces which alleviate the need for such knowledge.

Users of a GUI typically interact with icons and controls in a GUI by moving a mouse pointer and then clicking a mouse button when the pointer is over the icon or control, or using other input devices such as a keyboard, microphone, light pen, and the like. (Hereafter, the mouse is referred to as an example input device without implying any limitation to this device). To enable the user to invoke particular operations on a computer system, the user interface needs to provide selection mechanisms to the user. In a typical user interface environment, this may be achieved by defining user interface controls such as toolbar buttons which invoke an operation in response to user interaction, context menus and combination box controls that allow selection of particular actions or property values (e.g. font selection), entry fields that allow the setting of a string property (e.g. a Web page URL), check boxes, scrollable lists, and radio buttons. Such controls are very widely used within user interfaces. The programming code which implements them is typically written by a programmer as part of the task of application program development, or pre-defined controls are supplied by the operating system or development environment.

In the past, GUIs have tended to be standardised by GUI developers so that users can easily and quickly learn how to use a new product. The use of standard features minimises the amount of new and unfamiliar user interaction sequences and interface behaviour that must be learnt and so avoids user effort and frustration. Since many user interface controls such as those mentioned above have been given consistent behaviour and visual appearance across a great many applications, they are now easily recognised and used by computer users.

However, with the accelerating interest in the World Wide Web Internet service as a vehicle for providing access to a huge range of different material and in particular as an advertising medium, consistency of appearance is becoming less desirable. Companies each want their own Web site to be distinctive—to be more eye catching, more memorable and more animated than their competitors' sites. The same requirements for distinctiveness also increasingly apply to application programs which are sold for local installation. Thus, the traditional bland grey appearance of user interface controls is often undesirable and graphic designers are increasingly being employed to create more distinctive alternatives.

Whilst graphic designers are skilled in the creation of exciting visuals, they do not typically have the programming skills necessary to deploy those visuals in the way they (or their customers) might like. A large number of GUI builder products, comprising computer program products for assisting a user with GUI creation, are now commercially available. Although simplifying the task of creating a user interface, many existing GUI builder products still require significant programming skills for their use, and so creating an attractive and distinctive interface requires the combination of design skills and programming skills. The end result is often either an unsatisfactory compromise or a prohibitive cost.

Additionally, user interface creation is time consuming even for those who do have the relevant programming skills. If the programmer is required to fully define all user interface controls, including their functions, their state models comprising a set of states and state transitions, and their appearance attributes, then a considerable amount of coding is involved. As well as the undesirable effort, there is an additional problem that interface control functionality may be inconsistent between different applications if the interface controls are separately coded each time. Clearly, if the function of interface controls which appear to be the same differs between applications, the end user is left confused and may fail to use the controls properly.

Computer program developers are often forced, by time or resource constraints, to compromise the completeness of the state models for controls they build, or sometimes omit elements of the expected behaviour through ignorance, oversight or misunderstanding. This not only leads to possible errors, but also contributes to user frustration with the interface and reduces the ease of use of the resulting application.

SUMMARY OF THE INVENTION

In a first aspect of the invention, a user interface builder tool is provided for use in the creation of computer system user interfaces, including:

a set of definitions of selectable user interface control types including, for each control type in said set, one or more predefined functions and a predefined state model defining a set of operational states and transitions between the states;

means for generating a user interface control of a selected type;

means for associating property attributes with one or more operational states of said generated user interface control.

A user interface builder tool according to the invention preferably includes means for selecting a control type from the set for inclusion of an instance of the selected control type within a user interface being created, the means for selecting including means for positioning the instance of the selected control type at a required position within the user interface.

The means for associating property attributes preferably includes means for user setting of property attributes for specific operational states, the interface builder tool providing a framework including mechanisms for associating such attributes with states of a control.

The provision of predefined functionality and a predefined state model for each of a plurality of user interface controls, together with means supporting user setting of attributes and means for associating such attributes with specific states of a control, greatly simplifies the task of user interface creation and facilitates the achievement of functional consistency of user interface controls across different applications and Web sites.

The predefined state model for each control type preferably defines a comprehensive set of operational states which the interface creator (i.e. the person creating an interface using the present invention) can select from, such that the creator can implement different levels of complexity for a given type of interface control according to the desired effect in the interface being created. Either the comprehensive set of states or a subset of these states may be presented.

Property attributes which may be set for an instance of an interface control using the means for setting attributes according to a preferred embodiment of the invention include the behavioral style of the control instance (i.e. how many distinct states are implemented) and property attributes for particular states including media such as: images; animation sequences using sets of images; sound clips; and mouse pointer images. The invention according to this embodiment thus provides great flexibility in the setting of property attributes of controls (which are the non-functional, appearance attributes) while the functional aspects (the state model and the function of the control) are predefined.

Further embodiments of the invention support use of additional media, for example text to be used for text-to-speech synthesis, and video clips. The invention according to a preferred embodiment thus provides an open architecture or framework which does not constrain use of different types of media.

For example, a push button control may be required for inclusion in a user interface to trigger an application operation when a user clicks on the button. A selectable set of behavioral styles provided for the push button control in accordance with the present invention may include: a first standard button control style (wherein only a 'button up' state and a 'button down' state are used, with respective images differentiating between when the button is pressed by a user and any other time); one or more predefined alternative button styles (for example with a few additional states such as a disabled state and a hovering state, with an additional image for each); and one or more user defined behavioral styles. A user-defined style may be something non-conventional which includes, for example, desired animation sequences and sound clips for a comprehensive set of states.

Note that one of the options for the behavioral style property mentioned above is a user defined style. In a particular preferred embodiment of the invention, the user interface builder tool includes a mechanism for accepting user-input image files and audio clips which are stored outside the UI builder tool and for associating the images and audio with specific states of an instance of a user interface control.

This support for flexible setting of attributes, enabling the creation of a highly customised user interface, is preferably implemented without requiring any programming by the interface creator. A preferred implementation of the invention provides a property setting facility as part of an interface creation GUI, which enables setting of property attributes by standard GUI interaction techniques such as mouse selection. The user interface creation builder provides a framework for associating such attributes with specific states of specific controls. This enables the user interface creator to focus on the design aspects of user interface creation, without being limited by their personal level of programming skill. (Of course, programming skills may be required for other parts of an application program for which an interface is being created).

An additional advantage of the present invention is that it makes it easy for an interface creator to apply attributes which make interface controls intuitive for end users. That is, state attributes can be set to be informative of the result of further interaction with the control, or informative of an action which is currently being performed. For example, feedback can be given to end users in response to mouse proximity and keyboard focus.

An example of this is where an interface creator using the present invention associates a series of images for an animation sequence with a 'hovering' state of an interface control (a state in which a mouse pointer is over the control but no mouse button has been pressed), which animation sequence suggests the function that will be triggered by further user interaction. A button control which is set to trigger turning to a new page of text when pressed may have associated with its hovering state an animation sequence comprising images of a book which give the appearance of turning pages when the images are cycled through. An alternative attribute which may be set for the hovering state is a sound clip which says "Click here to turn page".

The comprehensive support for user interface creation provided by the present invention enables great flexibility in the creation of distinctive interfaces while avoiding the significant programming effort normally required of a user interface developer who wishes to employ a comprehensive state model or to apply non-standard images, animation, or audio sequences to create an original interface. The basic required functional behaviour of each of the supported controls is predefined together with a set of states and the state transitions which result from certain events, and yet visual and other aspects of the controls' appearance are modifiable. The present invention thus implements a separation of functional logic (the model) from visual representations (the view), and provides great flexibility in the setting of representations for a wide range of user interface controls.

In one embodiment, the present invention is implemented in a computer system comprising a processing unit, memory, input means for receiving user input from a user input device (such as a mouse, keyboard or microphone), and output means for communicating output information to a connected output device (e.g. to a display device). The computer system has a user interface builder tool installed on the computer or accessible there from. The interface builder tool includes: a set of definitions of selectable user interface control types including, for each control type, one or more predefined functions and a predefined state model defining a set of operational states and transitions between the states; means for generating a user interface control of a selected control type; and means for associating property attributes with one or more specific operational states of a user interface control. The computer system also includes: means for selecting a control type from said set, for inclusion of a control instance within a user interface being created, including means for positioning an instance of the selected control type at a required position within the user interface; and means for presenting to an output means, for communication to an output device, data corresponding to representations of the selected user interface control. The representations incorporate the property attributes associated with the control.

The invention in a second aspect provides a computer program product comprising computer readable program code stored on a computer readable recording medium, the program code including a user interface builder tool for use in the creation of computer system user interfaces, the user interface builder tool including:

a set of definitions of selectable user interface control types including, for each control type in said set, one or more predefined functions and a predefined state model defining a set of operational states and transitions between the states;

means for generating a user interface control of a selected type; and means for associating property attributes with one or more of said operational states of a selected user interface control.

BRIEF DESCRIPTION OF THE DRAWINGS

FIG. 4 shows an example of Java code for the initial declaration of states of a button control;

FIG. 5 shows an example of Java code for defining the transitions between states of a button control;

FIG. 6 shows Java code defining mappings between the different states of a button control; and FIG. 7 shows Java code for initialising the state of a button.

DETAILED DESCRIPTION OF THE PREFERRED EMBODIMENTS

The present invention according to a preferred embodiment is implemented as a user interface builder framework for an interface builder tool running on a computer system. The user interface builder tool comprises computer program code, stored in a computer readable form, for controlling the operation of the computer on which it is run. The computer program code may be modified to run on many different types of computer and operating system platform, for example an IBM Personal Computer having IBM's OS/2 operating system software or Microsoft's Windows 95 operating system software installed there-on. (OS/2 is a trademark of International Business Machines Corporation. Windows 95 is a trademark of Microsoft Corporation).

Figure 1:
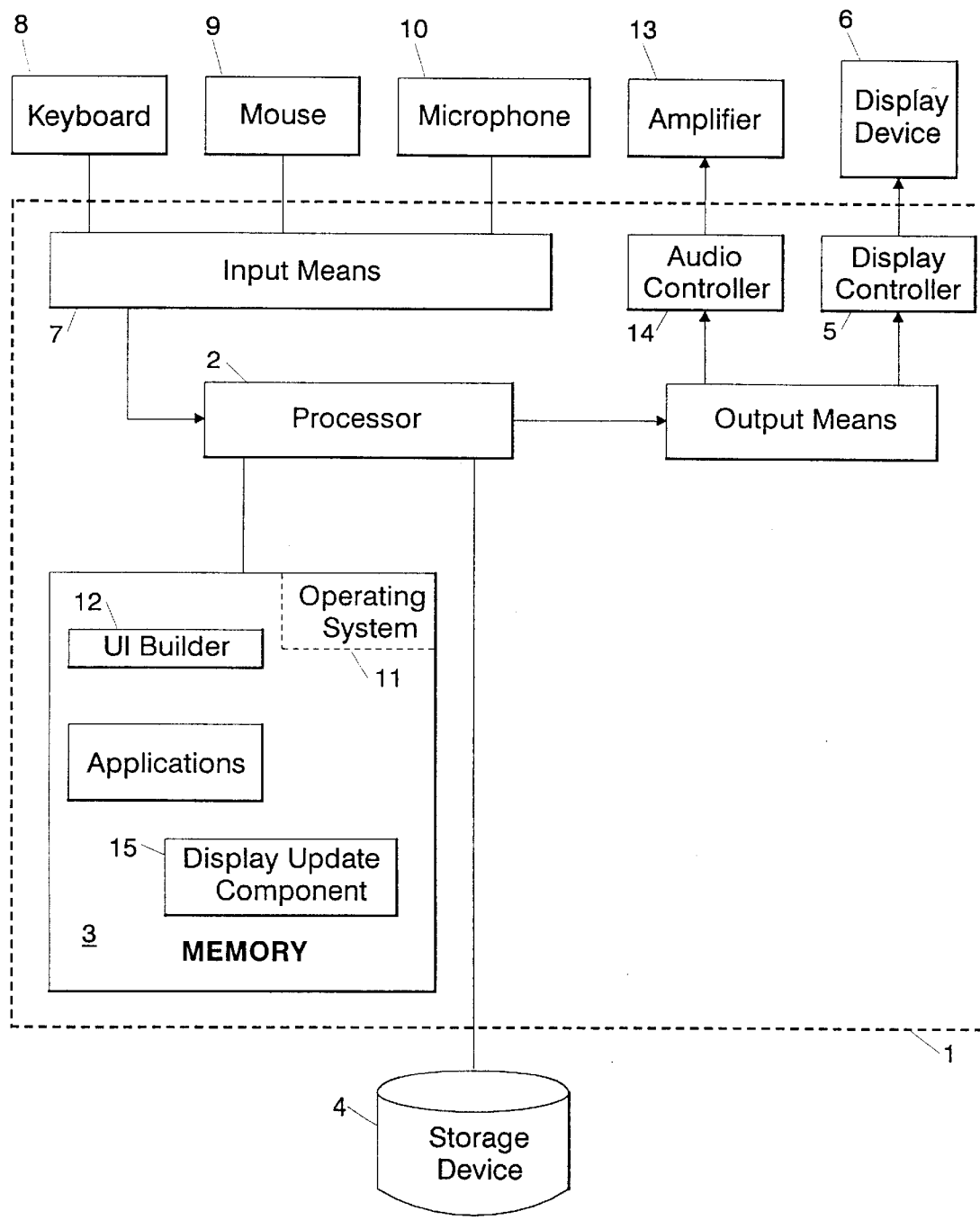
FIG. 1 is a schematic representation of a computer system suitable for implementation of the present invention.

FIG. 1 shows the main functional elements of a typical computer system in which the present invention is implementable. The computer system 1 includes a central processing unit 2, memory 3, a storage device 4 which may be incorporated as part of the system or accessed remotely, an input means 7 for receiving user input from a keyboard 8, a mouse 9 or a microphone 10, a display controller 5 for transferring data received from the processor 2 to a connected display device 6, and an audio output controller 14 for passing audio signals from the processor to one or more speakers 13. The display controller 5 encompasses the various software and hardware elements used to pass data to the display device 6, as is well known in the art. In the OS/2 operating system, a layer of the operating system known as the Presentation Manager is used for this purpose. In the preferred embodiment of the invention, however, mapping to underlying operating system UI controls is not implemented. The computer program code of the user interface builder tool according to this embodiment is written in the Java programming language (Java is a trademark of Sun Microsystems Inc). As is known in the art, the standard Java class library includes a component (hereafter the 'display update component' 15) within the standard java.awt.Component class, which is used for passing display data to a display controller.

System memory 3 stores the operating system software 11 and any application program currently running on the system, including the user interface builder tool 12. A GUI displayed on the display device 6 presents the user with visual representations of certain windows and icons including interface controls with which the user can work. Audio information may be played via the speakers 13.

As is well known in the prior art, user interface controls are provided within a GUI to enable a user to invoke certain actions and to set certain properties. For example, a required operation within an application program may be a printing routine. A push button control may be provided to enable the user to invoke the print operation. Push button controls may similarly be provided at appropriate places within the application for triggering the application to continue to a next stage, or to perform a save operation, or any other operation.

When developing an application program, a computer programmer defines the particular functional operations within the application which are to be performed in response to user interactions with interface controls. Program code implementing user interface controls (including code for responding to interaction with the controls to invoke those operations) is also conventionally written by the application developer. The function of a user interface control itself is to respond to user interactions (e.g. mouse clicking over a button) by invoking an operation or updating a value for a property that the programmer has set to be responsive to the control, and to cause a display controller to provide the correct representation data for the control to a display device.

With the previous example of a push button associated with a print routine, the program code implementing the button control responds to user interaction with the button by sending to a display update component 15 held in system memory an instruction to provide to the display controller 5 a selected push button image. The selected image is one of a plurality of images representing different states of the button—for example there may be two images showing the button pressed and not pressed respectively. The button control code also sends a message to a print component to trigger the print operation. Such functional behaviour of the push button type of control is standardised across many applications, and so users typically recognise and use it immediately.

In certain circumstances, the required push button representations may be two similar images of a standard sized, grey, rectangular button with the text word "Print", each of the images being associated with one of the two basic states of the button—firing (pressed) and idle (not pressed). However, with the desire to make user interfaces more distinctive, creators of user interfaces often wish to replace such standard user interface controls with something more eye-catching and unusual. They may wish to provide different behaviour for states additional to the pressed and idle states, or to use customised images, animation and/or sound clips.

Coding this from scratch for a number of different controls is time consuming and prone to inconsistencies between different implementations of the same control type, since it involves the programmer in defining the function of the control, defining an appropriate state model, and defining appearance attributes. The effort is greatly increased if there are a large number of different states required and the control is required to have a different appearance for each state.

A user interface builder tool implementing the present invention enables customisation of user interface controls while maintaining the basic functional behaviour of the control including, inter alia, the function of issuing an event which invokes an application-defined operation or updates a property value and which causes an appropriate image to be sent to a display controller.

When using the interface builder tool according to the preferred embodiment of the invention to create a user interface, code components implementing standard control functions can be simply selected. The provision of pre-defined user interface controls as self-contained code components which can be downloaded (for example from Web pages) for inclusion within a user interface is known in the prior art. However, the present invention extends that support by provision of mechanisms for association of property attributes, which may be set by a user, with specific pre-defined states of these user interface controls; by enabling selection of which of the predefined states are to be used; and by enabling a range of different media to be incorporated within the property attributes of a given control state, such that very flexible customisation of user interface controls is possible. Moreover, this is provided without the interface creator having to write any computer program code.

Figure 3:
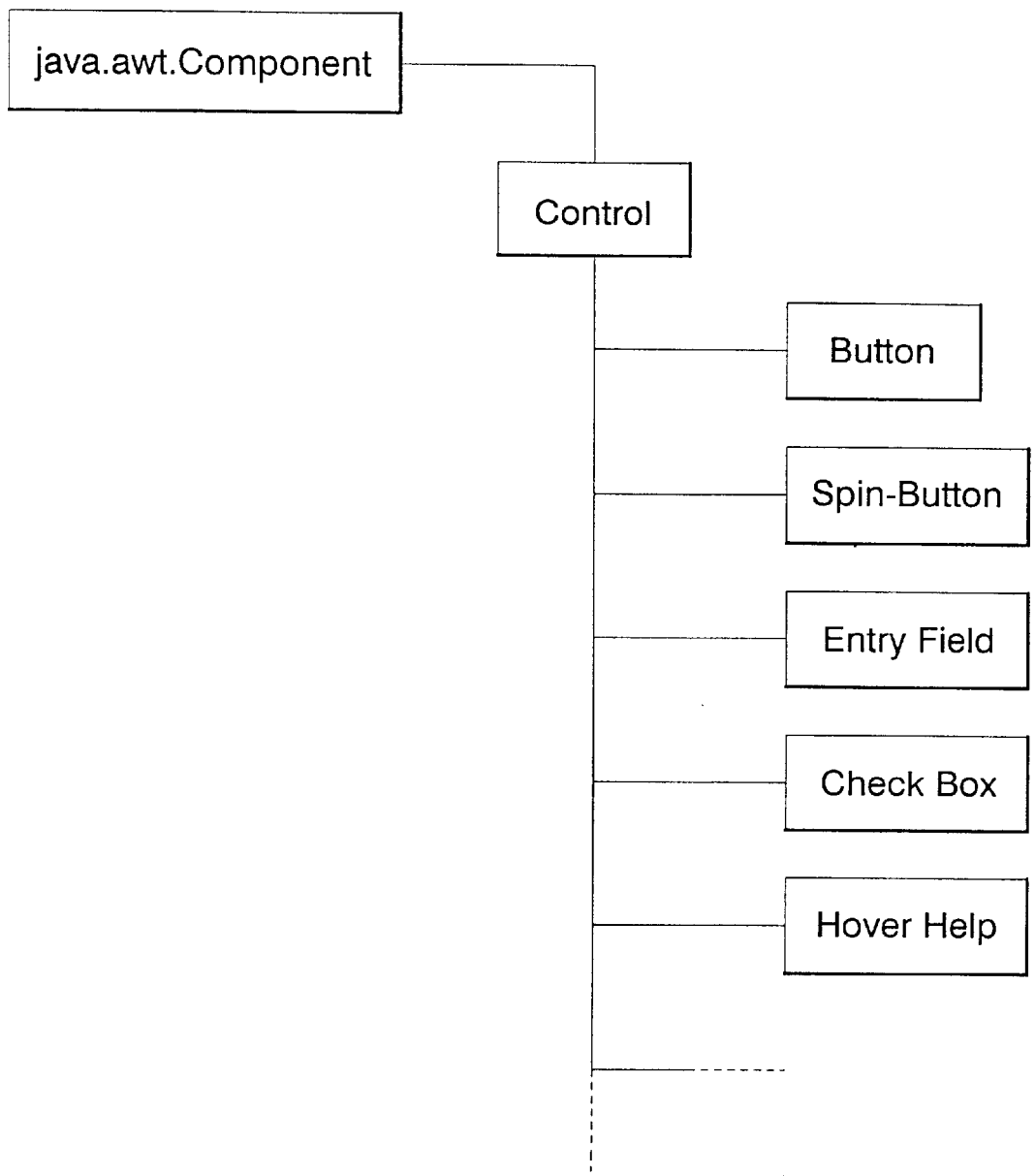
FIG. 3 shows a class hierarchy in which a class Control extends the base class java.awt.Component, and various type-specific user interface control classes extend Control.

As well as the push buttons mentioned above, other well known interface controls which have predefined functions and state models within the user interface builder tool according to a preferred embodiment of the present invention include entry fields, spin buttons, drop down menu lists, HoverHelp, and check boxes (see FIG. 3). Many other controls, or only a subset of these controls, could be supported in other embodiments. The present invention is thus not limited to a specific set of UI controls.

The interface builder tool 12 of the present invention generates an instance of a user interface control in response to selection of a user interface control type, and supports setting of property attributes for these controls by the interface creator. One possible means for such selection is "drag and drop", which is known in the art. The user interface control types supported by the user interface creation tool have functional behaviour which is recognised by those skilled in the art as standard for the particular control, but flexibility is provided in setting non-functional behavioral 'style' and appearance properties.

The user interface builder tool according to the preferred embodiment of the present invention provides a model for each of a plurality of user interface control types, comprising a predefined plurality of operational states and the required state transitions which are to take place in response to specific external events such as mouse interactions, and means for associating particular visual attributes with particular instances of each control. The invention separates the behavioral logic of user interface controls from their visual representations.

For each supported user interface control, conventional functional behaviour is provided as noted above. Also, a substantially comprehensive set of operational states is defined for each control type and a facility is provided for setting behavioral styles and other control attributes in association with these states. Clearly, there is no requirement for all possible states to be used (distinguished as separate states) for every instance of a user interface control, but it is desirable for a substantially comprehensive set of states to be defined for each control type to avoid an interface creator having to define additional states and to cater for the cases where several different states are required. A user interface creator using the present invention can determine how many states are appropriate for a given use of the control (for example, a push button implementation may require only two states, "pressed" and "idle", or more states including "hovering", "suspended", etc).

The functional behaviour of each user interface control is provided in the preferred embodiment of the invention as a set of object classes, as will be described in detail below. Object Oriented Programming (OOP) is a particular approach to software development which implements required functions by way of 'messages' sent to 'objects'. An 'object' is a software package that contains a collection of data and related software procedures (often called 'methods') which operate on that data. Typically, objects are created as instances of a particular 'Object Class', the class being a template for defining the procedures and data for a particular type of object. A 'message' is a signal sent to an object to request that object to carry out one of its procedures. Hence a message sent to an object will cause a procedure to be invoked to implement the required function.

In an object oriented environment, an interface control object issues an event to another object which may be a specific component of an application program. The application object is an event listener which has registered with the interface control (or with a class from which the specific control inherits)—i.e. the application developer has set the application object to be informed of interface control object events. The interface control object is in turn an event listener for events triggered by user interaction with views of the control on a GUI. A second listener for the user interface control object is the display update object 15 which provides the function of passing display data to the display controller.

A specific embodiment of this invention will now be described in more detail, including software components comprising an interface builder framework, their relationships to each other, and their relationships to components outside of the framework. This embodiment of the invention is implemented using the Java(TM) development language and tool kit.

The components may be split into two categories: state definition and management; and media definition and management. The state management aspects of the framework are generalised such that new control behaviour may be created simply by defining a state transition matrix for that control. Media management is generalised to allow a range of media to be associated with the states of a control.

A specific example is described for a simple push button control, and scenarios for the provision of media are described.

State Definition and Management

Specific to this embodiment are four components concerned with state definition and management: Control; Button; StateTransitionEngine; and StateTransitionManager. Of these, three are intended to be entirely generic: only Button is implemented with specific behaviour for a given control.

In addition, there are two helper classes to assist with the monitoring of state changes within StateTransitionEngine. These are StateEvent, used to encapsulate state change information, and StateListener, an interface that prescribes methods to be implemented by components that wish to listen for state transitions.

Control

Within Java, a standard component, called java.awt.Component, acts as the target for user interface events such as those generated by mouse and keyboard interactions. It is also used as the presentation route for media information.

The software component Control extends java.awt.Component to provide the generic behaviour related to all controls in the context of this embodiment of the invention. Control is an abstract class: it cannot be instantiated in its own right. It must be extended to provide state and state transition information. Whenever a new instance of a multi-state control is created (e.g. an instance of Button—see below), the generic behaviour of Control comprises:

Obtaining state information from the specific extension class and using it to create a new instance of StateTransitionEngine.

Create a new instance of StateTransitionManager giving it a reference to the Control instance, and the instance of StateTransitionEngine created above.

Create a new instance of MediaPool giving it a reference to the Control instance.

Create a new instance of MediaController giving it a reference to the Control instance, and the instance of MediaPool created above.

Call StateTransitionManager.setMediaController (MediaController) giving it a reference to the instance of MediaController created above.

Call MediaController.setStateTransitionManager (StateTransition Manager) giving it a reference to the instance of StateTransitionManager created above.

Button

Figure 2:
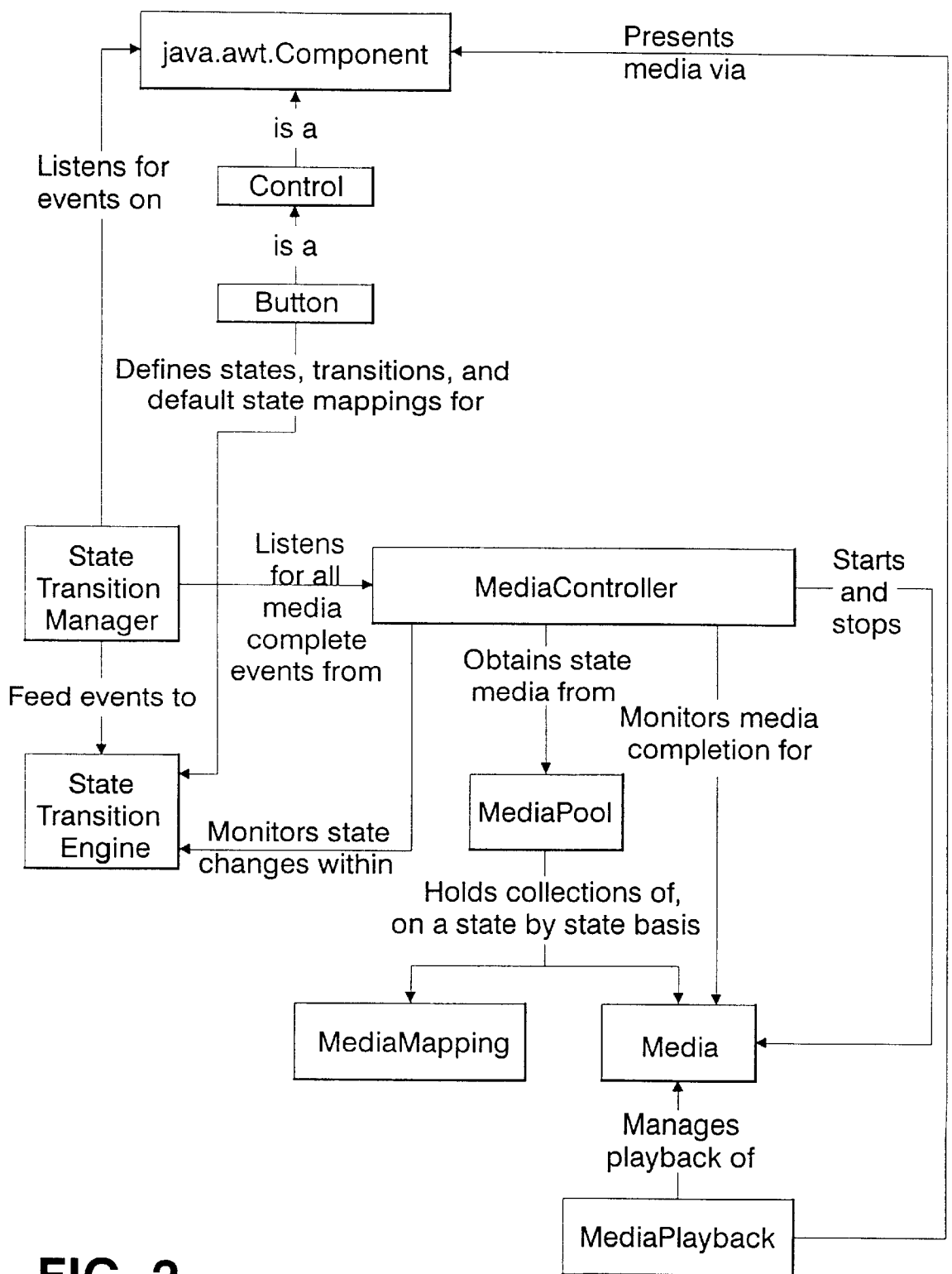
FIG. 2 shows the main component classes and the relationships between the classes of a user interface builder framework according to an implementation of the present invention.

In FIG. 2, an extension of Control called Button is shown, as an example of a widely used user interface control. Button is responsible for defining the possible states, and state transition information to describe the semantic behaviour of all instances of Button. This information correlates the possible states for Button with all recognised events that can occur on Button, and defines the state transition that occurs for each state when a recognised event occurs. In this implementation, the state transition information is a two dimensional array of integer representations of states and events (see FIG. 5). FIG. 4 shows the declaration of the possible states of an instance of Button.

The Button control as predefined within the user interface builder tool of the present embodiment has the following states defined:

IDLE The button is in this state when the mouse pointer is not over the button, and the button does not have keyboard focus.

HOVERING The mouse pointer is over the button, but the button does not have keyboard focus.

PENDING The mouse pointer is over the button, the mouse button has been depressed over the button and remains depressed. The act of depressing the mouse button has also given the button keyboard focus (i.e. keyboard focus is given to the java.awt.Component which is under the mouse pointer)

SUSPENDED From PENDING, the mouse pointer has been moved outside of the button boundary without releasing the mouse button. The inclusion of this state within the sate model allows the user to release the mouse button without triggering the button's function.

IDLE_FOCUS The button has keyboard focus, but the pointer is not over the button.

HOVERING_FOCUS The button has keyboard focus, and the pointer is over the button.

FIRING The mouse button has been released while in the PENDING state. The button triggers an event for any components which are listening.

DISABLED The button is disabled and does not have keyboard focus.

DISABLED_FOCUS The button is disabled, but has keyboard focus

FIRING_EXITED From FIRING or FIRING_LOSTFOCUS, the mouse pointer has been moved outside of the button boundary.

FIRING_LOSTFOCUS From FIRING or FIRING_EXITED, keyboard focus has been removed from the button.

FIRING_EXITED_LOSTFOCUS From FIRING_EXITED, keyboard focus has been removed from the button; or from FIRING_LOSTFOCUS, the mouse pointer has been moved outside of the button boundary.

The transitions between these states in response to external events such as mouse interactions with the push button are represented in FIG. 5. FIG. 5 shows how the state transition array for Button is defined according to the preferred embodiment (statically defined once, immutably, for all instances of Button).

In addition to defining the possible states and state transition matrix, Button is responsible for defining any default state mappings. State mappings are used to allow media for one state to be reused for another state. In this way, a designer of media for a button need not create media for all known states: media are only needed for those states which are not completely mapped to another state. In this implementation, the default state mappings are held as a two dimensional array of integer representations of states. FIG. 6 shows the code used to statically define the default state mappings array.

It can be seen from FIG. 6 that, by default, only the IDLE and PENDING states require media: all other states will map directly or indirectly to one or other of those two. The media required may then simply be two different images of a button, giving the appearance of a three dimensional button in pressed and not pressed conditions respectively, or the media may include sound clips or animation sequences, etc. The ability to work with a subset of states, enabled by the mappings between states, simplifies the task of defining media for UI controls as compared with the alternative of requiring the comprehensive set of states to have their media set separately. A designer, once familiar with media provision for these two states, is free to explore the provision of media for other states, to whatever degree of complexity is required.

A further responsibility of Button is to define the default initial state for each instance. FIG. 7 shows the code used to define it.

One final responsibility of Button is to provide the externalised names of the set of states. This information is provided via the String [ ]=Button.getStateNames ( ) method, and would typically be used by a visual builder tool to present a list of states to the designer.

As discussed previously, an interface builder tool according to the preferred embodiment of the invention enables an interface creator to set attributes such as media and media mappings by means of known GUI interaction techniques. Using display and interactive selection techniques which are known in the art for visual construction tools, a button control type may be selected from a control palette presenting visual representations of different user interface control types. Selection from the control palette provides access to a "Button Properties" notebook (for example, via a context menu having a "Button Properties" option). The interface creator selects various property attributes such as button colour, text for the button, images, the button's size, and the button style (or selects default settings). When all of the required attributes for the states of a particular button instance have been set, an instance of Button is created which is associated with an instance of MediaPool which contains the collections of attributes which have been set for particular states.

The Button instance is created by a Constructor method within the Button class, the Constructor passing state and property attribute information to the Control class to enable creation of an instance of each of StateTransitionManager, StateTransitionEngine, MediaController and MediaPool (the instance of MediaPool encapsulating the Media which the user has associated with specific states). The instance of MediaPool may be stored in a MediaPool repository together with an identifier for use in the creation of new instances of a button at run time.

StateTransitionEngine

StateTransitionEngine is constructed with a reference to a Control, and provides access to the statically defined state information in the Control extension, in this case Button. It's primary responsibility is to accept an event identifier and, if appropriate, trigger a state change based on the state transition model of the related control.

StateEvent

StateTransitionEngine will create a new instance of StateEvent every time a state change is notified. StateEvent carries details of the state transition so that listeners can determine what action to take. In this embodiment, the MediaController is a listener to the StateTransitionEngine, and it responds to state transition notifications as defined below (see MediaController).

StateTransitionManager

StateTransitionManager acts as the conduit of user interface events on the control, and on media events related to the control. To achieve this it implements the relevant listener interfaces of the standard java.awt.event package. These prescribe methods that are called when user interface events of interest occur. In addition, StateTransitionManager implements the MediaControllerListener interface defined by this invention. This interface prescribes a method that is called when a MediaController deems that all media for a given state have completed their presentation cycles.

On receipt of an event, StateTransitionManager determines the event identifier corresponding to the event and hands it on to StateTransitionEngine.handleEvent(int eventId).

Media Definition and Management

Specific to this embodiment of the invention are five components concerned with media definition and management: MediaController; MediaPool; Media; MediaMapping; and MediaPlayback. All of these are entirely generic.

In addition, there are six helper classes to assist with the monitoring of state changes within MediaController, MediaPool, and Media. These fall into two categories: event objects that encapsulate change information; and listener interfaces that prescribe methods to be implemented by components that wish to 'listen' for these changes.

MediaController

MediaController implements the StateListener interface as a means of monitoring the StateTransitionEngine for state changes. It also implements the MediaListener and MediaPoolListener interfaces, to enable it to monitor various Media for media completion and to monitor the MediaPool for changes to the media associated with a state of a control.

MediaController monitors Media for completion of a playback cycle. MediaController keeps track of which Media it has started, and which have not yet signalled their completion. It thereby understands which Media it expects to receive such notification from, and knows when all media for a given state have completed their playback cycle. When this situation is detected, listeners are notified with a MediaControllerEvent. In particular, StateTransitionManager will receive this notification, extract the event identification, and forward it to StateTransitionEngine, possibly resulting in a change of state.

When a state change notification is received, MediaController calls Media.stop(java.awt.Component component) on all Media that it has started. It then requests a collection of Media for the new state from MediaPool by calling MediaPool.getMediaFor(int state). Having obtained this, each Media in the collection is activated by calling the Media.start(java.awt.Component component, MediaListener method) method, passing a reference to the MediaController as the MediaListener.

When MediaPool change notification is received, MediaController checks to see whether the change relates to the current state of the related control. If it is, a similar process is followed as for a state change notification.

Additionally, MediaController supports a setMediaPool (MediaPool mediapool) method. This is designed to allow for the wholesale change of media for a control, for example where a desktop theme is changed.

Mediapool

MediaPool acts as a repository for Media objects organised by the possible states of the related control. It is the content of MediaPool which will be edited by a designer, typically using a suitable visual builder tool, in order to customise the media for a control.

MediaPool is constructed with a reference to a Control, and obtains the possible states, the externalised state names, and the default state mappings from that Control. For each possible state, MediaPool maintains a collection of Media and/or MediaMapping objects. When constructed, these collections are either empty or contain a MediaMapping. Certain embodiments of the present invention allow for default Media to be defined by specific controls so that construction of MediaPool initialises the collections with default Media as well as default MediaMapping objects.

MediaPool provides methods to allow these collections to be interrogated and modified, to facilitate the provision of editing capabilities by a visual builder tool. In the preferred embodiment, this includes a browse facility which is selectable by the interface creator so as to open a dialog which facilitates navigation through local computer system memory for files of a given type (e.g. a designer's image files). Such a file browsing facility is known in the art. An alternative to such a browsing facility is to implement 'drag and drop' selection from desktop folders (that are navigated to within the user interface creation facility) to receptors within the property attribute setting facility. On modification, MediaPool notifies listeners with a MediaPoolEvent object detailing the modification.

To rationalise the Medias and MediaMappings for a given state, the MediaPool.getMediaFor(int state) method is provided. This will return a collection of Media objects for the state.

MediaMapping

The role of MediaMapping is to identify an alternative state whose Medias are to be used. An alternative state so identified may itself include MediaMappings as part of its media definition. When MediaPool is asked for the media for a state via the MediaPool.getMediaFor(int state) method, it will resolve all media mappings before returning the consolidated media. It is this mapping capability that allows for economy of media, and apparent simplicity, on a relatively complex control.

Media

The Media interface defines the methods implemented by components representing media such as image sequences, audio clips, video clips, mouse pointer sequences, etc.

Media implementations support the following standard capabilities:

An option to play media data once only or continuously.

The ability to vary the replay rate of media.

Media instances manage the presentation of the related media data on a java.awt.Component by java.awt.Component basis. The Media.start(java.awt.Component component, MediaListener mediaListener) method will create a new instance of a MediaPlayback component for the media in question, and add it to a monitored list. Media.stop (java.awt.Component component) will halt the operation of the MediaPlayback for the control, and remove it from the monitored list. Media instances delegate media completion notification responsibilities to instances of MediaPlayback by passing a reference to the MediaListener passed with the start method through to the MediaPlayback constructor.

By managing MediaPlayback components in this way, reuse of in-memory media data is optimised. Multiple instances of MediaPlayback can share media data from the Media instance that spawns them.

MediaPlayback

A MediaPlayback instance is responsible for the playing of one set of media data on behalf of one Media instance. The target java.awt.Component and the MediaListener are given to MediaPlayback when it is constructed. MediaPlayback instances will run asynchronously in another thread where appropriate, and notify the single MediaListener when a media cycle is complete. For continuously playing media, media cycle completion will never occur.

The preferred embodiment of the present invention described above provides a user interface builder framework comprising a set of facilities that could be used by, or to create, a user interface builder tool for running on a computer system. The UI builder framework greatly simplifies user interface creation both by the provision of predefined state models which do not need to be created from scratch by application developers and by the provision of a mechanism for association of media with specific states of a user interface control. The set of predefined states are presented to an interface creator (rather than masked within the code of a UI builder, as in prior art implementations) in a manner which enables easy user setting of state-specific attributes.

Alternative embodiments of the invention implement a user interface builder tool as a component of an application development tool or a Web page authoring tool. Within an application development tool, the user interface builder tool greatly simplifies interface creation such that the developer can focus their programming efforts on the operations to be performed by the application.

In one alternative embodiment of the present invention, each user interface control is defined by the following set of object classes:

a first object class encapsulating a plurality of different operational states for the control type and logic defining state transitions responsive to user interactions with controls of this type;

a second object class encapsulating media and control information to be associated with specific states of an instance of the user interface control type;

a third object class for performing presentation of said media for specific states of the user interface control instance; and means for responding to user interaction events by triggering state transitions for the control instance in accordance with said logic and for triggering the presentation of said media.

What is claimed is:

1. A user interface builder tool for use in the creation of computer system user interfaces, including:

a set of definitions of one or more user interface control types including, for each control type in said set, one or more predefined functions and a predefined state model defining a set of operational states and transitions between the states;

means, responsive to selection of a user interface control type for generating an instance of a user interface control of the selected type;

means, for associating property attributes with one or more operational states of said generated user interface control instance, wherein the means for associating property attributes with states of a user interface control includes means for mapping a first one of said states to a second one of said states, such that all property attributes associated with the second state will be automatically associated with the first state.

2. A user interface builder tool according to claim 1, including:

one or more object classes encapsulating said set of definitions of user interface control types;

a state transition manager for listening for user interface control events and issuing events in response to said user interface control events;

a state transition engine for listening for events from the state transition manager and, responsive to said events and in accordance with the respective state models of said user interface control types, triggering state transitions of particular instances of the user interface controls; and a media controller for providing state-specific media to the state transition manager in response to events from the state transition engine.

3. A user interface builder tool according to claim 2, wherein the media controller is adapted to obtain state-specific media from a media pool storing collections of media on a state-by-state basis.

4. A user interface builder tool according to claim 3, including means for user selection of media to be associated with states of a user interface control, for generating the media collections of the media pool.

5. A user interface builder tool according to claim 4, wherein said means for user selection of media includes means for user selection of images from a set of images.

6. A user interface builder tool according to claim 5, wherein said means for user selection of media to be associated with states of a user interface control includes means for user selection of image sequences and animation attributes for the image sequences.

7. A user interface builder tool according to claim 3, including means for user selection of mappings between different states and for storing said mappings together with said media in said media pool, such that media associated with one state can be associated with a plurality of states by means of said mappings.

8. A user interface builder tool according to claim 1, including a state transition manager for issuing events in response to user interface control interactions, which events trigger/state transitions for particular instances of user interface controls; wherein the means for associating property attributes includes:

means for user selection of media and/or other property attributes which are to be associated with particular states of a user interface control; and a mechanism for associating the selected media/attributes with said particular states, which mechanism automatically provides said selected media/attributes to said state transition manager in response to user interactions with user interface controls.

9. A user interface builder tool according to claim 8, wherein the means for associating property attributes enables user selection by means of GUI interaction techniques and/or audio interface interaction techniques.

10. A user interface builder tool according to claim 1, wherein said predefined state models include predefined default mappings between different states, only a subset of said set of states being presented to the user as distinct states when said mappings are applied, and wherein the user interface builder tool includes means for user selection of whether said mappings are to be applied.

11. A user interface builder tool according to claim 1, wherein the tool enables customization of user interface controls while maintaining the basic functional behavior of the controls.

12. A computer program product comprising computer readable program code stored on a computer readable recording medium, the program code including a user interface builder tool for use in the creation of computer system user interfaces, the user interface builder tool including:
- a set of definitions of one or more user interface control types including, for each control type in said set, one or more predefined functions and a predefined state model defining a set of operational states and transitions between the states;
- means, responsive to user selection of a user interface control type, for generating an instance of a user interface control of the selected type;
- means for associating property attributes with one or more operational states of said generated user interface control instance, wherein the means for associating property attributes with states of a user interface control includes means for manning a first one of said states to a second one of said states, such that all property attributes associated with the second state will be automatically associated with the first state.

13. A user interface builder framework including:
- a set of definitions of one or more user interface control types including, for each control type in said set, one or more predefined functions and a predefined state model defining a set of operational states and transitions between the states;
- means responsive to selection of a user interface control type for generating an instance of a user interface control of the selected type;
- means for associating property attributes with one or more operational states of said generated user interface control instance, wherein the means for associating property attributes with states of a user interface control includes means for mapping a first one of said states to a second one of said states, such that all property attributes associated with the second state will be automatically associated with the first state.

14. A computer system having installed thereon, for controlling operation of the computer system, a user interface builder tool including:
- a set of definitions of one or more user interface control types including, for each control type in said set, one or more predefined functions and a predefined state model defining a set of operational states and transitions between the states;
- means, responsive to selection of a user interface control type, for generating an instance of a user interface control of a selected type;
- means for associating property attributes with one or more operational states of said generated user interface control instance, wherein the means for associating property attributes with states of a user interface control includes means for mapping a first one of said states to a second one of said states, such that all property attributes associated with the second state will be automatically associated with the first state.

15. A framework for customization of user interface controls, for use in a computer system having means for selection via a user interface of user interface controls associated with a state transition manager for triggering state transitions in response to user interface control interactions, the framework including
- means, for associating attributes with one or more operational states of a selected user interface control, wherein the means for associating property attributes with states of a user interface control includes means for mapping a first one of said states to a second one of said states, such that all property attributes associated with the second state will be automatically associated with the first state, said means for associating attributes further including:
- means for user selection of media and/or other property attributes and for user selection of the states with which the media and attributes are to be associated; and
- a mechanism for associating the selected media and attributes with said selected states, which mechanism automatically provides said selected media and attributes to said state transition manager in response to said user interface control interactions.

16. A user interface builder tool for use in the creation of computer system user interface, including:
- a set of definitions of one or more user interface control types including, for each control type in said set, one or more predefined functions and a predefined state model defining a set of operational states and transition between the states;
- means, responsive to selection of a user interface control type for generating an instance of a user interface control of the selected type;
- means for associating property attributes with one or more operational states of said generated user interface control instance;
- wherein said predefined state models include predefined default mappings between different states, only a subset of said set of states being presented to the user as distinct states when said mappings are applied, and wherein the user interface builder tool includes means for user selection of whether said mappings are to be applied.

17. A user interface builder tool according to claim 16, wherein the means for associating property attributes enables user selection by means of GUI interaction techniques and/or audio interface techniques.

18. A user interface builder tool according to claim 16, further including:
- a state transition manager for listening for user interface control events and issuing events in response to said user interface control events; and
- a state transition engine for listening for events from the state transition manager and, responsive to said events and in accordance with the respective state models of said user interface control types, triggering state transitions of particular instances of the user interface controls.

* * * * *